W. NORDGREN.
PISTON RING LOCKING DEVICE.
APPLICATION FILED OCT. 22, 1914.
1,240,764. Patented Sept. 18, 1917.
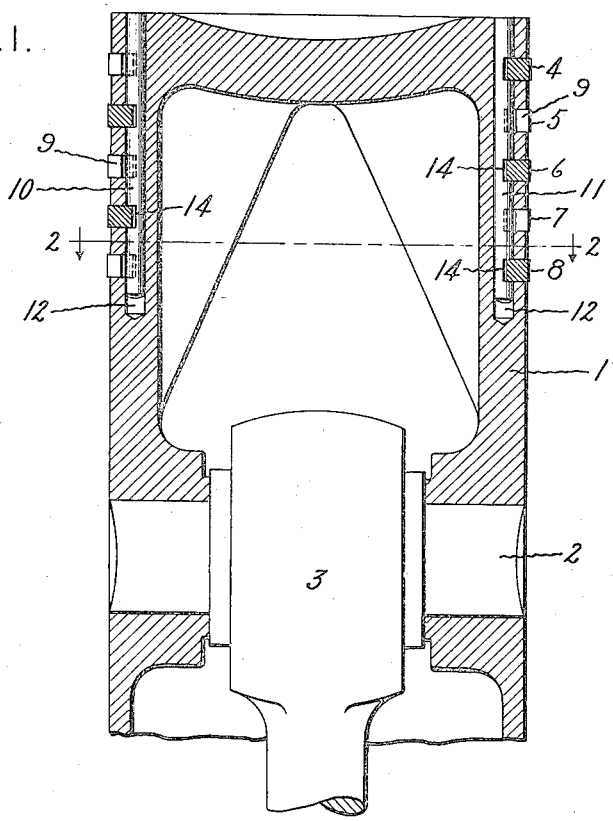
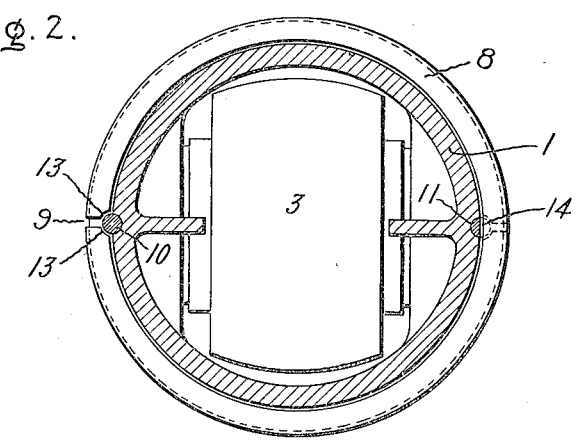
Witnesses:
E. Trojahowski
J. Ellis Glen
Inventor:
Werner Nordgren
by: Albert G. Davis
His Attorney.

UNITED STATES PATENT OFFICE.

WERNER NORDGREN, OF CHARLOTTENBURG, GERMANY, ASSIGNOR TO GENERAL ELECTRIC COMPANY, A CORPORATION OF NEW YORK.

PISTON-RING-LOCKING DEVICE.

1,240,764.   Specification of Letters Patent.   Patented Sept. 18, 1917.

Application filed October 22, 1914. Serial No. 868,102.

*To all whom it may concern:*

Be it known that I, WERNER NORDGREN, a subject of the King of Sweden, residing at Charlottenburg, Germany, have invented certain new and useful Improvements in Piston-Ring-Locking Devices, of which the following is a specification.

This invention relates to machines in which a piston coöperates with a cylinder, and its object is to provide an efficient means for preventing the rotation of the packing rings in the grooves in the piston. Piston rings are usually split to enable them to be sprung into the grooves, and if the rings work around until two or more of the joints get in longitudinal alinement the fluid under pressure in the cylinder can leak past the piston much more easily than when the joints in adjacent rings are kept angularly displaced.

Heretofore, piston rings have been kept from rotating by means of radial pins or screws which were driven into the piston and engaged with corresponding holes in the inside of the rings. If these pins or screws were of a comparatively large diameter, it was necessary to have correspondingly large holes in the piston rings, which, however, weakened the rings to such an extent that they soon broke. If the pins were made rather small, for the purpose of retaining the strength of the rings, they would break or wear down too fast. In any event, these pins were liable to get loose and cause considerable trouble.

My invention aims to overcome these difficulties by securing the rings by one or more bolts inserted into holes drilled lengthwise of the piston and intersecting the bottoms of the grooves for the rings. At the joint in each ring, the inner corners of the adjacent ends of the ring are cut away to engage the bolt. In this way, it is possible to use strong bolts without weakening the rings. Provision is also made for enabling the rings to lock the bolts in their holes, so as to dispense with all additional fastenings, which might get loose and wreck the machine.

In the accompanying drawing, Figure 1 is a longitudinal section of a piston equipped with my improved ring locking devices, and Fig. 2 is a cross-section on the line 2—2, Fig. 1.

The piston 1 which is illustrated is of the hollow or trunk variety, connected by a pin 2 with a pitman or connecting rod 3. It has the usual circumferential grooves for a plurality of packing rings 4, 5, 6, 7, 8; the exact number being immaterial. Each ring is split at 9, and the joints of adjacent rings are displaced angularly. In the drawing, the displacement is 180 degrees, because only two locking bolts 10, 11 are used. These are inserted in holes 12 drilled longitudinally in the piston, preferably from its top or head and intersecting the bottoms of the ring grooves. At the joint of each ring the inner corners of the adjacent ends of the ring are cut away at 13 to fit against one of the bolts, while that portion of the ring opposite the joint engages with a notch 14 cut in the other bolt and neatly fitting the ring. The ring is thus locked from rotating by one of the bolts and, in turn, it locks the other bolt in its hole.

In the drawing, the rings 4, 6 and 8 are locked from rotating by the left hand bolt, and the rings 5 and 7 by the right hand bolt; while the rings 5 and 7 lock the left hand bolt from slipping out, and the rings 4, 6 and 8 similarly lock the right hand bolt. A larger number of bolts may be used if the joints of the rings are displaced by 120, 90, or other number of degrees.

In assembling, the bolts are first inserted into their holes and turned to bring their notches to register with the grooves. The rings are then sprung into place as usual, the joints of alternate rings engaging with each bolt, so that the rings and the bolts interlock as described above.

All the notches 14 do not need to fit the corresponding rings, as it is sufficient if only one ring locks each bolt; the other notches being mere cut-away portions to permit the rings to pass the bolt.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination of a piston having circumferential grooves and a plurality of longitudinally extending holes which intersect said grooves, split piston rings in said grooves having their ends arranged at the points where the holes intersect the grooves, the ends of successive rings being arranged at different holes so they are staggered around the piston, locking bolts in said holes which engage between the ends of the rings to lock them in position, and means comprising locking connections between the piston rings and bolts to lock the bolts against movement.

2. The combination of a piston having circumferential grooves and a plurality of longitudinally extending holes which intersect said grooves, split piston rings in said grooves having their ends arranged at the points where the holes intersect the grooves, the ends of successive rings being arranged at different holes so they are staggered around the piston, and locking bolts in said holes which engage between the ends of the rings to lock them in position, said bolts having notches at each groove where piston ring ends are not located which receive the bodies of the rings to lock the bolts against movement.

3. The combination of a piston having circumferential grooves and a plurality of longitudinally extending holes which intersect said grooves, split piston rings in said grooves having their ends cut away at the inner corners and arranged at the points where the holes intersect the grooves, and locking bolts in said holes which engage in the spaces formed by the cut away corners to lock the rings in position, said bolts having notches at each groove where piston ring ends are not located which receive the bodies of the rings to lock the bolts against movement.

4. The combination of a piston having circumferential packing ring grooves, and longitudinally extending holes which intersect the bottom of said grooves, split packing rings in said grooves, and bolts in said holes, said rings and bolts being interlocked with each other so as to lock both the rings and bolts in position.

5. The combination of a piston having circumferential grooves and a plurality of longitudinally extending holes which intersect said grooves, split piston rings in said grooves having their ends staggered around the piston, and locking bolts in said holes, said locking bolts engaging recesses in some of the piston rings and having recesses which are engaged by other of the piston rings whereby the locking bolts serve to hold the rings against circumferential movement and the rings serve to hold the locking bolts against longitudinal movement.

In witness whereof, I have hereunto set my hand this 26th day of Sept. 1914.

WERNER NORDGREN.

Witnesses:
GUSTAV HULBROCK,
MANFRED REIP.